(12) United States Patent
Chambard et al.

(10) Patent No.: US 11,416,698 B2
(45) Date of Patent: Aug. 16, 2022

(54) METHOD FOR PROVIDING PROOF OF PRESENCE

(71) Applicant: SKIPLY, Aix-les-Bains (FR)

(72) Inventors: Jérôme Chambard, Chambéry (FR); Christophe Siebert, La Ravoire (FR)

(73) Assignee: SKIPLY, Aix-les-Bains (FR)

( * ) Notice: Subject to any disclaimer, the term of this patent is extended or adjusted under 35 U.S.C. 154(b) by 0 days.

(21) Appl. No.: 17/331,777

(22) Filed: May 27, 2021

(65) Prior Publication Data

US 2021/0374374 A1 Dec. 2, 2021

(30) Foreign Application Priority Data

May 27, 2020 (FR) ...................................... 2005583

(51) Int. Cl.
*G06K 7/14* (2006.01)
*G06K 19/06* (2006.01)
(52) U.S. Cl.
CPC ..... *G06K 7/1417* (2013.01); *G06K 19/06037* (2013.01)
(58) Field of Classification Search
CPC .................. G06K 19/06009; G06K 19/06037
See application file for complete search history.

(56) References Cited

U.S. PATENT DOCUMENTS

2008/0011827 A1* 1/2008 Little .................. H04W 12/082
235/382
2018/0285546 A1 10/2018 Greenberg

FOREIGN PATENT DOCUMENTS

EP 2747444 A1 6/2014
EP 3203444 A1 8/2017

OTHER PUBLICATIONS

French Search Report and Written Opinion dated Feb. 5, 2021 in priority application No. FR2005583; w/ English machine translation (total 17 pages).

* cited by examiner

*Primary Examiner* — Laura A Gudorf
(74) *Attorney, Agent, or Firm* — Seckel IP, PLLC (57) ABSTRACT

Method for providing proof of presence at a predefined location, comprising: an initialing step (E1) during which initialization data of a digital device (10) are transmitted to a server (20), a computing step (E2) in which the device iteratively computes, at a refresh frequency (FMIN), a time index (INDT), a step (E3) of displaying a validation matrix barcode on the screen of the device, and a step (E4) of validating a presence at the predefined location, comprising a sub step (E41) of scanning the validation matrix barcode displayed on the screen of the device by means of a communication terminal (30).

22 Claims, 2 Drawing Sheets

Fig. 1

Fig. 2

METHOD FOR PROVIDING PROOF OF PRESENCE

This application claims priority of French patent application No. FR2005583 filed May 27, 2020, the content of which is hereby incorporated by reference herein in its entirety.

TECHNICAL FIELD OF THE INVENTION

The invention relates to a method for providing proof of presence at a predefined location, on the basis of a scan of a matrix barcode. The invention also relates to a digital device comprising a screen able to display a dynamic matrix barcode. The invention also relates to a system for providing proofs of presence at a predefined location.

PRIOR ART

In many fields, there is a need to signal or to prove the presence of a person in a particular place. For example, in the field of in-person services, employees may be required to make a round passing through various places. To remotely monitor the correct completion of a round, various systems have been proposed.

Firstly, systems for providing proofs of presence such as clocking systems comprising an electronic unit equipped with a button are known. The unit is connected by a wired connection or a wireless connection to a remote server. When a user presses the button, the server receives information attesting to the presence of an individual at said unit. These systems are complex to implement because they require a unit that must be supplied with power and connected by connecting means to the server. In addition, these systems do not allow the person who pressed the button to be identified. The latter may be pressed by anyone, this leading to presence being mistakenly signalled. Lastly, such systems require a contact between a finger of the user and the button. For reasons of hygiene and/or to prevent the transmission of diseases, it is preferable to avoid, as much as possible, contact with buttons that other individuals could have manipulated beforehand.

Contactless systems for providing proofs of presence based on NFC technology (NFC being the acronym of near field communication) are also known. Although such systems do indeed allow the presence of a user to be proven without contact and him to be identified, these solutions are complex to implement and require that each user is equipped with a specific NFC card.

Lastly, systems for providing proofs of presence based on the use of matrix barcodes such as, for example, QR codes are also known. A given matrix barcode is printed and fastened in a predefined location. When a person wants to attest to his presence at this location, he scans the matrix barcode with his smartphone. This operation leads to a message being sent to a server connected to the smartphone, which records the presence. Such systems have the advantage of being contactless and simple to implement. However, they may be easily circumvented. Specifically, an ill-intentioned user may take a photo of the matrix barcode, print this photo and then scan the matrix barcode from anywhere.

Lastly, to overcome this difficulty, systems for providing proofs of presence comprising a device able to display variable matrix barcodes are known. The matrix barcodes are communicated by the device to a server. When an individual wants to attest to his presence at this location, he scans the matrix barcode with his smartphone. This operation leads to a message being sent to a server connected to the smartphone. The server may then compare on the one hand the matrix barcode received from the smartphone and on the other hand the matrix barcode communicated directly by the device. If these two codes are identical, it is possible to deduce therefrom that a user was indeed present at the predefined place to scan the matrix barcode. Such a system is more reliable but it is complex to implement, especially because it requires means for communicating between the device and the server, and the device to be plugged into the mains grid.

PRESENTATION OF THE INVENTION

The aim of the invention is to provide a system and method for providing proof of presence that remedy the above drawbacks and that are an improvement on known prior-art systems and methods for providing proof of presence.

More precisely, a first subject of the invention is a system and method for providing proof of presence that are simple to install, and that especially do not require means for communicating between a device and a server.

A second subject of the invention is a system and method for providing a proof of presence that cannot be falsified.

A third subject of the invention is a system and method for providing proof of presence contactlessly.

SUMMARY OF THE INVENTION

The invention relates to a method for providing proof of presence at a predefined location, the method comprising:
  an initializing step during which initialization data of a digital device are transmitted to a server, the device being installed at said predefined location, the device being provided with a screen able to display a matrix barcode, the initialization data comprising:
  a start index, at least one computational parameter, and a datum on refresh frequency, then
  a computing step in which the device iteratively computes, at the refresh frequency, a time index, the time index being equal to the result of an operation based on the at least one computational parameter and on the time index computed in a preceding iteration of the computing step, an initial value of the time index being equal to the result of an operation based on the at least one computational parameter and on the start index, then
  a step of displaying a validation matrix barcode on the screen of the device, the validation matrix barcode comprising the computed time index, then
  a step of validating a presence at the predefined location comprising a substep of scanning the validation matrix barcode displayed on the screen of the device by means of a communication terminal, then a transmitting substep in which the communication terminal transmits to the server the time index obtained from the scanned validation matrix barcode.

The validation matrix barcode may furthermore comprise a computer address of the server.

The initializing step may comprise a transmitting substep in which the communication terminal, especially a smartphone, transmits to the server the initialization data.

The initializing step may comprise:
  a substep of displaying, on the screen of the device, an initialization matrix barcode comprising a computer address of the server and said initialization data, then a scanning substep in which a communication terminal scans the initialization matrix barcode, then a transmitting substep in which the communication terminal transmits to the server the initialization data obtained from the scanned initialization matrix barcode.

The initializing step may be executed automatically as soon as the device is supplied with power, said displaying substep having a predefined duration, and especially a duration comprised between ten seconds and ten minutes inclusive.

The start index and/or the at least one computational parameter may be defined randomly by the device.

The method for providing proof of presence may comprise an encrypting step in which the device encrypts the initialization data, especially using XOR or AES encryption, then a decrypting step in which the server decrypts the received initialization data, and/or it may comprise an encrypting step in which the device encrypts the computed time index, especially using XOR or AES encryption, then a decrypting step in which the server decrypts the received time index.

The initialization data and/or the validation matrix barcode may comprise a voltage value of a power storage means of the device.

The initializing step and/or the step of validating a presence at the predefined location may furthermore comprise the transmission, to the server, by the communication terminal, of an identifier of the communication terminal and/or of an identifier of a user of the communication terminal and/or of an identifier of the device and/or a timestamp data indicating at which time the matrix barcode was scanned.

The step of validating a presence at the predefined location may comprise a comparing substep in which the server compares the time index received from the communication terminal with a time index computed by the server using a method identical to that employed by the device to compute the time index in said computing step.

The invention also relates to a digital device comprising a screen able to display a dynamic matrix barcode, a power storage means and hardware and software means configured to randomly generate at least one computational parameter and a start index, and to iteratively compute, at a refresh frequency, a time index, the time index being equal to the result of an operation based on the at least one computational parameter and on a time index computed in a preceding iteration, an initial value of the time index being equal to the start index.

The device may comprise a display device utilizing electronic ink.

The device may comprise a means for generating electrical power, and especially a photovoltaic means.

The device may comprise fastening means intended to interact with a holder, the fastening means being configured so that manipulation of the fastening means with a view to detaching the device from the holder results in a disconnection of the power storage means.

The invention also relates to a system for providing proofs of presence, comprising a server, and a device provided with a screen able to display a dynamic matrix barcode and/or a device such as defined above, the device and the server comprising hardware and software means configured to implement a method for providing proof of presence such as defined above.

The invention also relates to a computer program product comprising program-code instructions stored on a computer-readable medium, for implementing the steps of the method for providing proof of presence such as defined above when said program is run on a computer.

The invention also relates to a computer-readable data storage medium on which is stored a computer program comprising program-code instructions for implementing the method for providing proof of presence such as defined above.

PRESENTATION OF THE FIGURES

These subjects, features and advantages of the present invention will be described in detail in the following non-limiting description of one particular embodiment that is given with reference to the appended figures, in which.

DETAILED DESCRIPTION

Figure 1:
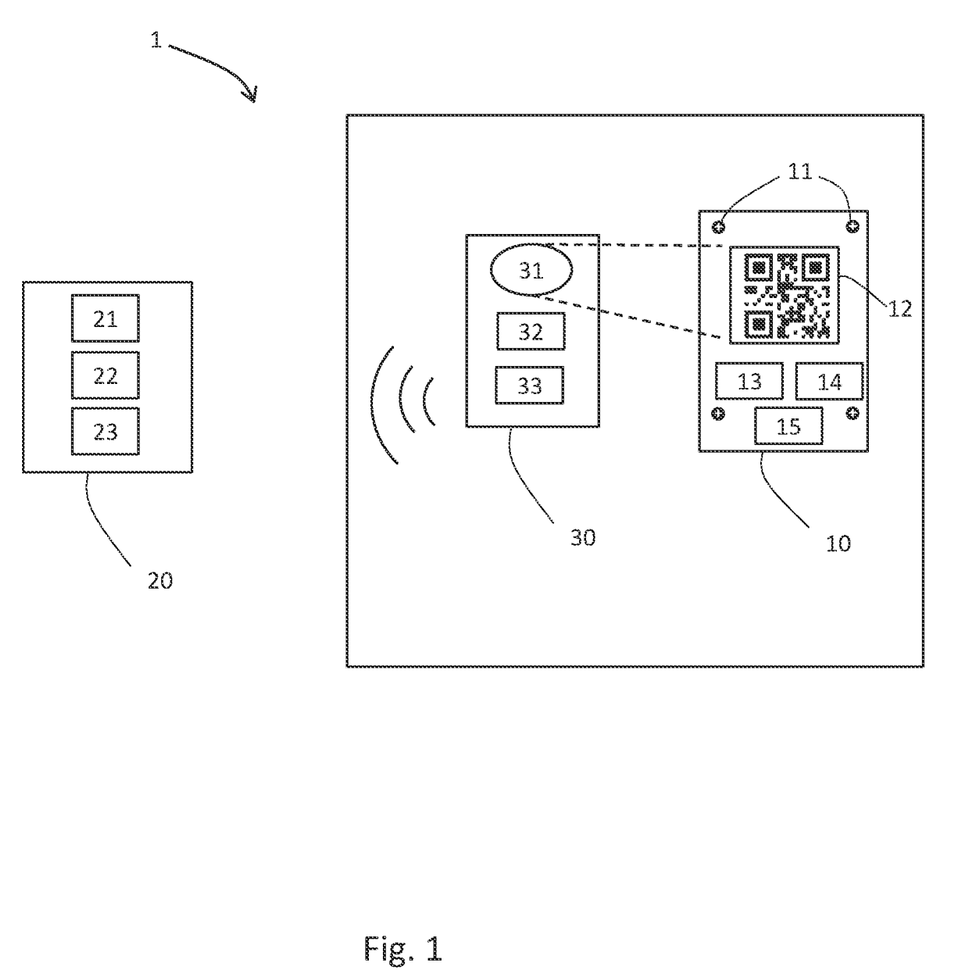
FIG. 1 is a schematic view of a system for providing proofs of presence according to one embodiment of the invention.

FIG. 1 schematically illustrates a system 1 for providing proofs of presence according to one embodiment of the invention. A system for providing proofs of presence is a monitoring system that is intended to signal and/or to attest to the presence of an individual or of a product in a determined place. Such a system may especially be used to verify correct completion of a round through various geographical places. According to one particular example, and nonlimitingly, the system for providing proofs of presence may for example serve to attest to the passage of an employee through or to the presence of an employee in various rooms of a building, for example with a view to performing a cleaning or maintenance operation therein. Other examples of application of the invention will be described below.

The system for providing proofs of presence (which could be more simply designated the "system 1") comprises, on the one hand, at least one digital device 10 and, on the other hand, a server 20.

The digital device 10 is installed in a predefined location. This location may for example be a private site, such as an office, a room or a common area in an establishment. The predefined location may be located in an area to which access is restricted. It may also be positioned outside, for example in front of a building, a block of flats or a private house. Said predefined location may also be located in a public place such as for example a railway or bus station, a hospital, or an administrative establishment. It may also be located onboard a means of public transport such as for example a train or a bus.

The digital device 10 comprises fastening means 11 that are arranged to fasten the digital device in the predefined location. These fastening means may for example comprise assembly holes and/or screws and/or rivets and/or adhesive. Advantageously, the fastenable device is permanently fastened to a non-removable holder in the predefined location and cannot be easily detached or moved.

The device 10 also comprises a screen 12 that is able to display a dynamic matrix barcode, i.e. a matrix barcode that varies over time. A matrix barcode may be a two-dimensional barcode forming a grid in which cells are displayed in two separate colours (for example black or white). The matrix barcode may for example be a Data Matrix and/or a QR code. Advantageously, the matrix barcode displayed on the screen 12 of the device 10 is a standardized barcode. It may for example be a code according to standard ISO/CEI 16022. The matrix barcode may thus be a barcode that is decryptable automatically by a communication terminal such as a smartphone, without prior installation of an application or of a dedicated decryption key. More generally, a matrix barcode may be any code containing digital information. The resolution of the screen 12 may be sufficient to display a matrix barcode with a width of about 200 cells and a height of about 200 cells. Thus, the screen 12 may be particularly simple since it may be no more than a monochromatic screen of about 200 pixels by 200 pixels. Advantageously, a matrix barcode makes it possible to display a large amount of information on a reduced surface. The size of the screen may be sufficiently large to allow a smartphone camera to detect and to read the displayed matrix barcode.

According to one preferred embodiment, the device 10 may comprise a display device using utilizing electronic ink, which is also denoted "e-ink" or "e-paper". Such a device is based on a technology that is also employed in the design of electronic readers. It has the advantage of consuming very little power.

The device 10 furthermore comprises a memory 13, a computing unit 14 or microprocessor and a power storage means 15 such as for example a rechargeable or non-rechargeable battery. The memory 13 and the computing unit 14 may be integrated into a circuit board connected to the screen 12 by way of a ribbon cable. The power storage means 15 allows the screen 12 and the computing unit 13 to be supplied with power. The device 10 requires no connection to a mains grid. In addition, the device may comprise no wired or wireless connecting means. It may also comprise no button, nor any means of interaction other than the screen 12. Thus, the design of the device is particularly simple and robust.

According to one variant embodiment, the device could however comprise a control button or means configured to turn the screen 12 on or off in order to save power. According to another variant embodiment, the device 10 could also comprise a reset button for resetting the device and thus getting an initializing step of the method, which step will be described in detail below, to run again. In such a case, the reset button will advantageously be well hidden and/or difficult to access in order to prevent any malicious use of the device.

The device 10 may be dedicated to the implementation of a method for providing proof. It may also be integrated into any medium and/or any piece of equipment performing various functions, provided that it comprises sufficient space for the screen 12 and the circuit board connected to the screen to be integrated into it.

Optionally, the device 10 may comprise a means for generating electrical power, especially a photovoltaic means. The photovoltaic means could for example be arranged behind the screen 12 or beside the screen. Thus, the device 10 will possibly benefit from an increased battery life, or even be rendered completely stand-alone.

The server 20 is a piece of computer equipment. It comprises communicating means 21, especially for receiving digital information originating from a communication terminal such as a smartphone. It also comprises a memory 22 and a computing unit 23 or microprocessor.

The memories 13 and 22 are computer-readable data storage media on which are stored computer programs comprising program-code instructions for implementing a method for providing proof of presence according to one embodiment of the invention. The computing units 14, 23 are able to execute the programs stored in the memories 13 and 22, respectively.

The implementation of the method for providing proof of presence is also based on the use of a communication terminal 30 such as a smartphone. The communication terminal 30 comprises a camera 31, communicating means 32 for sending data to the server 20 and a computing unit 33, which is especially able to decrypt a matrix barcode. Advantageously, all commercially available smartphones are at the present time equipped with such means 31, 32 and 33. As a variant, the communication terminal 30 could not be a smartphone but rather a simple electronic device the functionalities of which are limited to those required to implement the invention. In the described embodiment, the communication terminal 30 may be possessed by a user to the presence of whom at a predefined location it is desired to attest. Advantageously, the communication terminal may furthermore comprise a memory in which is stored an identifier of the communication terminal and/or an identifier of the user.

Figure 2:
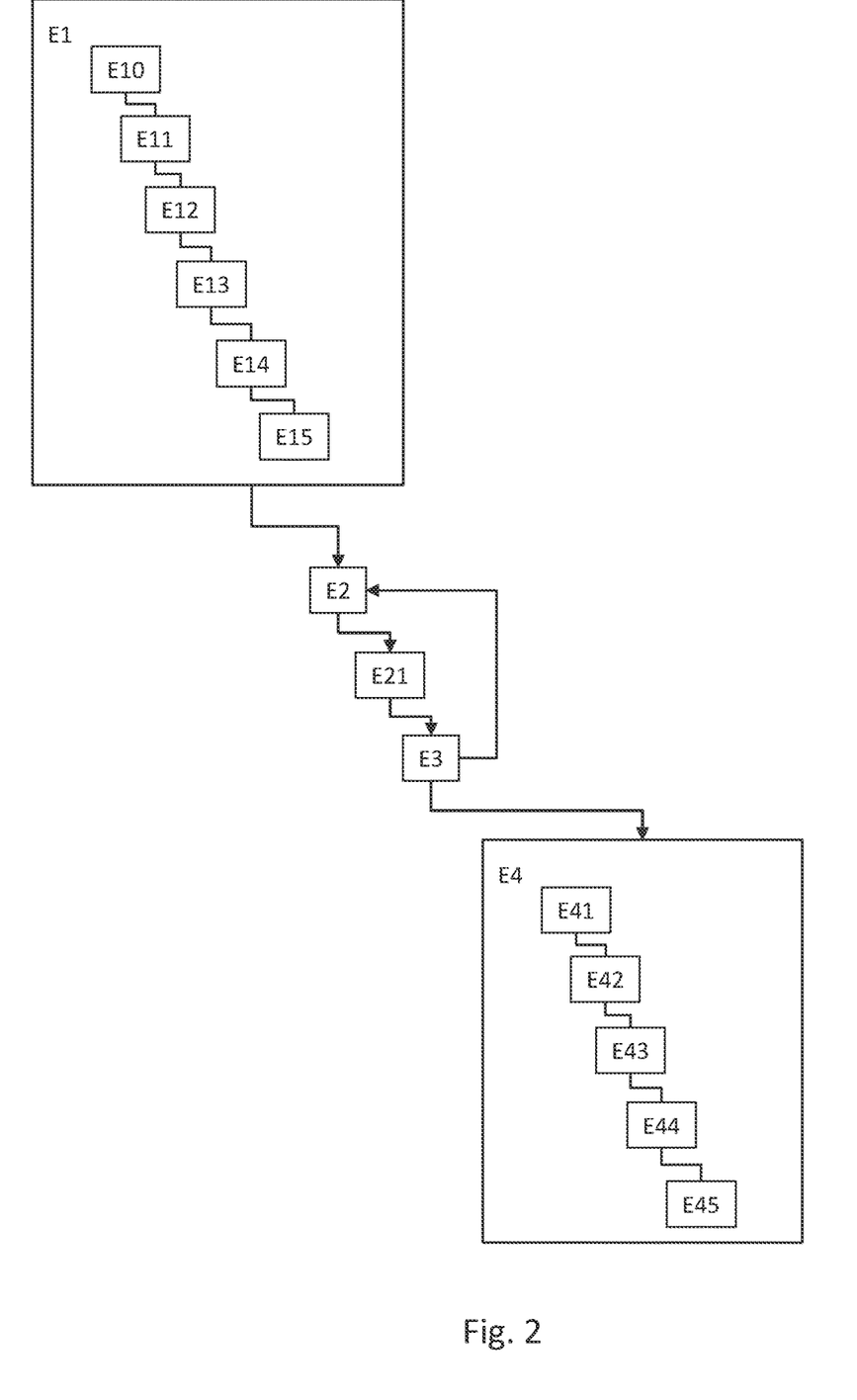
FIG. 2 is a flowchart of a method for providing proof of presence according to one embodiment of the invention.

One embodiment of the method for providing proof of presence will now be described with reference to FIG. 2. The method may be broken down into four main steps E1, E2, E3 and E4.

The first step is an initializing step E1. In this step, initialization data of the device 10 are transmitted to the server. These initialization data comprise:

a start index INDD,
  at least one computational parameter INCA,
  a datum on refresh frequency FMIN.

There may be any number of computational parameters. Nonetheless, the method is implementable with a single computational parameter. The following explanations may easily be transposed to a more complex method based on the use of a plurality of computational parameters.

According to one preferred embodiment of the invention, the start index INDD and the computational parameter INCA are randomly generated by the device 10. The start index INDD and the computational parameter INCA may for example be automatically and randomly generated as soon as the device is supplied with power, i.e. as soon as the power storage means 15 is connected. Thus, no control button is required on the device for it to be installed. As will be seen below, validation matrix barcodes will then be generated periodically depending on the start index INDD and on the computational parameter INCA. The advantage of defining these two parameters randomly is that it makes the matrix barcodes that are generated by the device more difficult to predict.

According to one variant embodiment, the start index INDD and the computational parameter INCA could not be randomly defined but rather defined using a relatively complex algorithm that would hence be relatively difficult to ascertain. According to another simpler variant, the start index INDD and the computational parameter INCA could be defined during the manufacture of the device. With this variant, the device would be simpler to manufacture and the initializing step would be faster. However, in this case, the validation matrix barcodes generated by the device would be easier to ascertain.

The datum on refresh frequency FMIN, or frequency FMIN, may be a predefined value defined during the manufacture of the device. As will be seen below, the frequency FMIN corresponds to the frequency at which the matrix barcodes generated and displayed by the device are changed. This frequency FMIN may be any frequency. It may for example be about one second, one minute, one hour, one day, or even one week. The device 20 therefore comprises an internal clock allowing said matrix barcodes to be changed at the frequency FMIN.

According to one variant embodiment of the invention, the device could comprise a means for adjusting the frequency FMIN. The frequency FMIN would then be defined in the initializing step and would not be modified subsequently, unless the device was reset.

Advantageously, when the initialization data have been generated by the device, said data may be transmitted from the device to the server by way of the smartphone 30. In this case, the initializing step E1 may comprise a first substep E11 in which an initialization matrix barcode is displayed on the screen 12 of the device 10. The initialization matrix barcode may then comprise a computer address of the server, in other words a URL address of the server, and said initialization data. The computer address of the server may be presented in a form such that the communication terminal automatically connects to the server 20 when the initialization matrix barcode is scanned, i.e. when the camera of the communication terminal is activated facing the initialization matrix barcode. The initialization matrix barcode may contain a message in the form: http(s)://zz.xxx.yy?s=<<cryptojeton_init>>, where http(s)://zz.xxx.yy, designates the computer address of the server and cryptojeton_init contains the initialization data. The datum cryptojeton_init may for example be obtained by concatenation of the various initialization data.

The initialization matrix barcode may remain displayed on the screen 12 of the device for a predefined duration, for example comprised between ten seconds and ten minutes inclusive, and especially a duration of about one minute. This duration may be computed from the moment of generation of the initialization data and/or counted from turn-on of the device. A duration may be chosen that leaves the user time to comfortably scan the matrix barcode displayed on the screen. Advantageously, the matrix barcode is not a code directly intelligible by the user. It is also impossible to memorize it once it exceeds a certain size. This reinforces the security of the method according to the invention.

In a second substep E12, the initialization matrix barcode is scanned with the camera 31 of the communication terminal 30. Advantageously, when the initialization matrix barcode contains a message in the form http(s)://zz.xxx.yy?s=<<cryptojeton_init>>, the communication terminal 30 automatically communicates the datum cryptojeton_init containing the initialization data to the server 20. This substep may therefore be executed very simply since the user need merely activate the camera of his communication terminal, aim it at the initialization matrix barcode displayed on the screen 12 and validate the suggestion to connect to the server that is automatically displayed.

As a variant, the message contained in the initialization matrix barcode could take any other form allowing the initialization data to be automatically transmitted to the server. According to another variant, the initialization matrix barcode could not contain the computer address of the server. The initialization data could then be transmitted to the server 20 manually or by means of a dedicated communication-terminal application. However, such a variant would take longer to implement and would require, where appropriate, an application to be installed on the communication terminal.

According to another particularity of the invention, all or some of the initialization data may be previously encrypted before being displayed on the screen 12. The encryption aims to prevent the start index INDD and/or the computational parameter INCA from being intercepted during the display of the initialization matrix barcode. In particular, XOR encryption may be used. Such encryption is based on the use of a secret encryption key and of a logic operator corresponding to an "exclusive OR". The data to be encrypted and the encryption key are converted into binary language and each bit of the data to be encrypted is encrypted using the "exclusive OR" function with the encryption key, which is repeated if it is shorter than the data to be encrypted. The secret key may be stored in a memory of the device 10. The advantage of XOR encryption is that it is simple to implement and completely impossible to decrypt if the secret key is not known. Alternatively, an AES (Advanced Encryption Standard) type encryption or even any other type of encryption algorithm could be used. AES encryption is particularly secure. The initialization data may thus be encrypted in a substep E10 executed before the substep E11 of displaying the initialization matrix barcode.

In addition and optionally, the initialization data may comprise other useful information. For example, the initialization data may furthermore comprise a number NBD of times the device has restarted since it was installed. This number NBD will possibly be used subsequently to increase the security of the matrix barcodes generated by the device 10.

The initialization data may also comprise a voltage value TP of the power storage means 15 of the device 10. This voltage value may be interpreted with a view to computing a remaining service time of the device. Thus, provision may be made for a maintenance operation to be carried out on the device with a view to replacing or recharging the power storage means 15, before the device ceases to operate.

In a third substep E13 of the initializing step, the communication terminal 30 transmits, to the server, the initialization data obtained from the scanned initialization matrix barcode. When the initialization data are encrypted, the server decrypts them. The initialization data may be decrypted in a substep E14 following the substep E13. To this end, the server may also comprise a decryption key in memory, and especially the key that was used to carry out the XOR or AES encryption.

Next, the initializing step E1 may comprise an authenticating substep E15 in order to ensure that the initializing step E1 is being executed by an authorized user. For example, in response to reception by the server 20 of the initialization data, the server may redirect the communication terminal 30 to an interface into which the user is invited to input a username and/or a password. The inputted username and/or password are transmitted from the communication terminal 30 to the server 20. The server 20 may then verify, by consulting a database of authorized users, that the user is indeed authorized to initialize the method. If the username and/or the password are recognized as valid, the server will possibly store the received initialization data in memory. If the username and/or the password are not recognized as valid, the server will possibly simply ignore the received initialization data. Thus, the method can be initialized only by authorized individuals and the security of the method is further increased.

Since the transmission of the initialization data occurs immediately or almost immediately after the initialization matrix barcode is scanned, the server 20 may be considered to receive them instantaneously or a short time after the scan of the initialization matrix barcode. Synchronization of the device 10 and of the server 20 is thus achieved. The synchronization of the device 10 and of the server 20 then has a precision substantially equal to the duration for which the initialization matrix barcode is displayed. It will therefore be understood that it may be desirable to display the initialization matrix barcode for a relatively short duration in order to obtain a precise temporal synchronization of the device 10 and of the server 20.

Advantageously, in the initializing step, the communication terminal 30 may also transmit, to the server 20, an identifier of the communication terminal and/or an identifier of a user of the communication terminal and/or an identifier of the device 10 and/or a timestamp data indicating at which time the initialization matrix barcode was scanned. The identifier of the communication terminal may for example be a serial number of the communication terminal or any other reference allowing the communication terminal to be identified. The identifier of the user of the communication terminal may for example be a name of the user, an email address or even any other code allowing the user of the communication terminal to be identified. These identifiers may be contained in a memory of the communication terminal and be automatically appended to the initialization data transmitted by the communication terminal 30 to the server 20. These identifiers could also be input manually on invitation into the communication terminal. The identifier of the device 10 may for example be a serial number of the device. Advantageously, it may form part of the initialization data and therefore be communicated to the communication terminal 30 via the display of the initialization matrix barcode. Alternatively, it could be input on invitation into the communication terminal. By virtue of this information, the server will be able to associate a given device with one or more communication terminals and/or one or more users.

Finally, at the end of the initializing step, the device 10 and the server 20 both possess in memory the initialization data, namely the at least one start index INDD, the computational parameter INCA, and the frequency FMIN. In addition, the device 10 and the server 20 are synchronized so as to be able to compute, substantially simultaneously, a time index dependent on these initialization data.

In a second step E2, the device computes a time index INDT iteratively and at the frequency FMIN. The second step E2 may be executed automatically at the end of the initializing step E1. An initial value of the time index INDT is equal to the result of an operation based on the computational parameter INCA and on the start index INDD. Subsequently, the time index INDT is equal to the result of an operation based on the computational parameter INCA and on the time index INDT computed in a preceding iteration of the second step E2.

The computational parameter may for example be a number that will be added to the time index INDT computed in a preceding iteration. As a variant, the computational parameter may be combined with the time index INDT computed in a preceding iteration using any type of operation, especially a multiplication, a subtraction, or a division. According to another variant, the type of operation itself is specified by the computational parameter INCA or by a portion of the computational parameter INCA. For example, the first two bits of the computational parameter INCA may be used to define whether the following bits of the computational parameter INCA must be added to, multiplied by, subtracted from or divided by the time index INDT computed in a proceeding iteration.

In the case where the method is based on the use of a plurality of computational parameters, it is possible to make provision to use even more complex computations to compute the time index INDT. For example, a first computational parameter could be added in one iteration of the second step E2 then a second computational parameter added in the following iteration of the second step E2. Such a method would be more complex to implement but could lead to the method for providing proof of presence being more secure against attempts to decrypt it or circumvent it. Where appropriate, the time index INDT may also be computed depending on the number NBD of times the device has restarted since its installation.

In a third step E3, a validation matrix barcode is displayed on the screen 12, the validation matrix barcode comprising the time index INDT computed in the second step E2. In other words, the validation matrix barcode is a representation coded in matrix form of the time index INDT. The validation matrix barcode displayed on the screen 12 is thus updated at the frequency FMIN. The first validation matrix code may be automatically displayed as soon as the predefined duration of display of the initialization matrix barcode has elapsed. A given validation matrix barcode may remain displayed on the screen until a new validation matrix barcode replaces it. Thus, the screen may be refreshed only at the frequency FMIN, this allowing power to be saved, in particular when the screen 12 comprises a display device utilizing electronic ink.

The validation matrix barcode is therefore dependent on the start index INDD, on the computational parameter INCA, on the frequency FMIN, and, where appropriate, on the number NBD of times the device has restarted since its installation.

Advantageously, the time index INDT may be previously encrypted before being displayed on the screen 12. The encryption aims to make it more difficult, or even impossible, to deduce the method used to compute the time index INDT by observing successively displayed validation matrix barcodes. In particular, XOR or AES encryption may be used. The encryption of the time index INDT may be based on a secret key identical to the secret key used to encrypt the initialization data. The time index INDT may thus be encrypted in a substep E21 executed after the step E2 of computing the time index INDT and before the step E3 of displaying the validation matrix barcode.

Just as with the display of the initialization matrix barcode, the validation matrix barcode may comprise other useful data in addition to the time index INDT. Firstly, the matrix barcode may comprise the computer address of the server 20, so that the communication terminal automatically connects to the server when the validation matrix barcode is scanned. The validation matrix barcode may contain a message in the form: http(s)://zz.xxx.yy?s=<<cryptojeton_valid>>, where http(s)://zz.xxx.yy designates the computer address of the server and cryptojeton_valid contains the time index INDT, where appropriate in encrypted form.

In addition, the validation matrix barcode may comprise the number NBD of times the device has restarted since its installation. The validation matrix barcode may therefore not only be computed depending on the number NBD but may also contain this information. The validation matrix barcode may also comprise the voltage value TP of the power storage means 15 of the device 10.

In a fourth step E4, the presence of a user at the predefined location is validated. To do this, a user is invited to scan the matrix barcode displayed on the screen of the device at the moment at which he wants to notify his presence at the predefined location. More precisely, the fourth step E4 comprises a substep E41 of scanning the validation matrix barcode displayed on the screen 12 by means of the camera of a communication terminal. This communication terminal may be the same communication terminal as that used for the initializing step or, as a variant, may be a different communication terminal.

Next, the fourth step E4 comprises a transmitting substep E42 in which the communication terminal transmits, to the server 20, the time index INDT obtained from the scanned validation matrix barcode. The server 20 is considered to receive the time index INDT instantaneously or a short time after the scan of the validation matrix barcode. Substep E42 may be executed automatically when the validation matrix barcode comprises the computer address of the server 20. The fourth step E4 may therefore be executed very simply since the user need merely activate the camera of his communication terminal, aim it at the validation matrix barcode displayed on the screen 12 and validate the connection to the server suggested by his communication terminal.

In addition to transmitting the time index INDT, an identifier of the communication terminal used to scan the validation matrix barcode and/or an identifier of the user of the communication terminal and/or an identifier of the device on which the validation matrix barcode was displayed and/or a timestamp data indicating at which time the validation matrix barcode was scanned may be transmitted in a substep E43.

When the time index was encrypted in step E21, the fourth step E4 comprises a substep E44 decrypting the time index, especially by means of the secret key shared with the device.

Next, the fourth step E4 comprises a comparing substep E45 in which the server compares the time index INDT received from the communication terminal in substep E42 with a time index INDT_B computed by the server using an identical method to that employed by the device to compute the time index in the computing step E2.

Since the server 20 possesses the initialization data shared in the initializing step, it is able to apply the same computing algorithm as the device 10 to also compute a time index INDT_B. It may also repeat this computation at the frequency FMIN. The server may therefore predict, at any given time, the time index INDT computed by the device 10 without having to set up a communication with the latter. If the time index INDT is identical to the time index INDT_B, it is possible to reliably attest to the presence of a user at the predefined location. If the time index INDT is different from the time index INDT_B, it may be assumed that a fraud has been attempted.

It is also possible to estimate the time at which this user was present at the predefined location. The frequency FMIN will possibly be chosen depending on the intended use of the system for providing proofs of presence. In particular, if it would be useful to know with precision the time at which the user scanned the validation matrix barcode, a higher refresh frequency FMIN will possibly be used. The execution of the method requires only manipulation by the user of his own communication terminal. The method is therefore hygienic and limits the transmission of diseases.

By virtue of the invention, a high degree of security is obtained with respect to attempts to predict the validation matrix barcodes that will be displayed in the future. In particular, the use of randomly defined initialization data and the application of encryption to the data displayed in the form of matrix barcodes provide two layers of security. It is therefore particularly difficult to falsify a proof of presence.

An ill-intentioned individual seeking to scan a validation matrix barcode in a place different from the initially intended place would be required to move the device 10 in its entirety. In order to prevent such a circumvention, the device may comprise fastening means 11 that are difficult to remove. Provision may for example be made for fastening means 11 the manipulation of which requires temporary disconnection of the power storage means 15. For example, the device 10 could be fastened in place by virtue of fastening screws and at least one of these fastening screws could comprise a screw head inside a housing provided for the power storage means 15. Thus, movement of the device 10 would necessarily require the device to be turned off and therefore a desynchronization with the server 20. The device 10 would then no longer be usable to validate the presence of a user until a new initialization was carried out. The number NBD may optionally be monitored in order to prevent any attempt to reset the device. According to another example, the device 10 may be configured so that its batteries are automatically ejected if the device is detached from its holder.

If the identifier of the communication terminal and/or the identifier of the user of the communication terminal transmitted in substep E43 do not correspond to an identifier stored by the server, and especially to an identifier stored in the server in the initializing step, the server may ignore the message received from the communication terminal. It is thus possible to reject any attempts to validate presence made with an unauthorized communication terminal and/or by an unauthorized user. If the identifier of the communication terminal and/or the identifier of the user of the communication terminal transmitted in substep E43 does indeed correspond to an identifier stored by the server, then the presence may be recorded and assigned to the stored identifier. When various communication terminals and/or various users are stored by the server as authorized to scan a validation matrix barcode, it is possible to identify which of these communication terminals and/or which of these users scanned the validation matrix barcode. Substep E44 may be executed as soon as the server 20 receives the time index sent by the communication terminal or, as a variant, may be executed later on, for example at the end of the day.

It will be noted that, for the server 20 to know the validation matrix barcode displayed on the device 10, a good synchronization of the internal clocks of the device and of the server is required. The internal clock of the device and/or of the server may drift with respect to a reference time base. The precision of the internal clock of the device and/or of the server may typically be about 0.06%. In order to mitigate any potential effect of temporal drift between the internal clock of the device and the internal clock of the server, the method for providing proof of presence may also comprise a step in which a temporal resynchronization of the server 20 with the device 10 is performed. For example, this resynchronization may be performed when a user scans in quick succession two different validation matrix barcodes.

It is also possible to define optionally adjustable tolerance periods applicable to each transition of the time index INDT_B computed by the server 20. These tolerance periods may for example have a duration of about a few seconds or of a few tens of seconds. The duration of the tolerance periods may be chosen or computed depending on the precision of the internal clocks of the device and/or of the server, and depending on the average scan frequency of the validation matrix barcode. Advantageously, the duration of the tolerance periods may be adjustable by the server and require no intervention by the device 10 or by the communication terminal 30. If the server 20 receives a time index INDT corresponding to a prior or subsequent time index INDT_B during the tolerance period, it may be concluded that there is a temporal desynchronization between the server and the device and a resynchronization may be carried out.

Advantageously, when a timestamp data indicating at which time the validation matrix barcode was scanned is transmitted from the communication terminal 30 to the server 20 during the validation step E4, the sub-step E45 can be carried out at the end of any delay following the sub-step E41. Based on the timestamp data, the server 20 can determine which validation matrix barcode was displayed on the equipment 10 at the time it was scanned. This makes it possible to compensate a possible time lag between the execution of sub-steps E41 and E45.

The invention will possibly be applied to various use cases. For example, the invention may be used in the following cases:
to validate a maintenance operation on a site,
to validate correct completion of a round through various predefined places,
by posted personnel, for clocking in and out,
to prove a parcel has been left at a location in the absence of the intended recipient,
to prove or signal the presence or visit of an individual, especially a common carrier, at/to a predefined place such as a place of residence or a business,
to replace a doorbell or an interphone at the entrance of a dwelling.

The invention claimed is:

1. A method for providing proof of presence at a predefined location, wherein the method comprises:
performing an initializing action during which initialization data of a digital device are transmitted from the digital device to a server, the digital device being installed at the predefined location, the digital device being provided with a screen able to display a matrix barcode, the initialization data comprising:
a start index,
at least one computational parameter,
a datum on refresh frequency, then
performing a computing action in which the digital device iteratively computes, at the refresh frequency, a time index, the time index being equal to a result of an operation based on the at least one computational parameter and on the time index computed in a preceding iteration of the computing action, an initial value of the time index being equal to the result of an operation based on the at least one computational parameter and on the start index, then
displaying a validation matrix barcode on the screen of the digital device, the validation matrix barcode comprising the computed time index, then
validating a presence at the predefined location, comprising:
scanning the validation matrix barcode displayed on the screen of the digital device by a communication terminal, then
transmitting, by the communication terminal to the server, the time index obtained from the scanned validation matrix barcode.

2. The method for providing proof of presence according to claim 1, wherein the validation matrix barcode further comprises a computer address of the server.

3. The method for providing proof of presence according to claim 1, wherein the initializing action comprises transmitting, by the communication terminal to the server, the initialization data.

4. The method for providing proof of presence according to claim 1, wherein the initializing action comprises:
displaying, on the screen of the digital device, an initialization matrix barcode comprising a computer address of the server and the initialization data, then
scanning, by a communication terminal, the initialization matrix barcode, then
transmitting, by the communication terminal to the server, the initialization data obtained from the scanned initialization matrix barcode.

5. The method for providing proof of presence according to claim 4, wherein the initializing action is executed automatically as soon as the digital device is supplied with power, the displaying having a predefined duration.

6. The method for providing proof of presence according to claim 1, wherein at least one selected from the group consisting of the start index and the at least one computational parameter is defined randomly by the digital device.

7. The method for providing proof of presence according to claim 1, comprising at least one of the following:
encrypting, by the digital device, the initialization data, then decrypting, by the server, the received initialization data,
encrypting, by the digital device, the computed time index, then decrypting, by the server, the received time index.

8. The method for providing proof of presence according to claim 1, wherein at least one selected from the group consisting of the initialization data and the validation matrix barcode comprises a voltage value of a power storage means of the digital device.

9. The method for providing proof of presence according to claim 1, wherein the initializing action, the validating of the presence at the predefined location, or both the initializing action and the validating of the presence at the predefined location further comprise transmitting, by the communication terminal to the server, at least one selected from the group consisting of an identifier of the communication terminal, an identifier of a user of the communication terminal, an identifier of the digital device, and a timestamp data indicating at which time the matrix barcode was scanned.

10. The method for providing proof of presence according to claim 1, wherein the validating of the presence at the predefined location comprises comparing, by the server, the time index received from the communication terminal with a time index computed by the server using a method identical to the method employed by the digital device to compute the time index in the computing action.

11. A digital device comprising a screen able to display a dynamic matrix barcode, a power storage means and hardware and software configured to:
randomly generate at least one computational parameter and a start index, and
iteratively compute, at a refresh frequency, a time index, the time index being equal to a result of an operation based on the at least one computational parameter and on a time index computed in a preceding iteration, an initial value of the time index being equal to the start index.

12. The digital device according claim 11, comprising a display device utilizing electronic ink.

13. The digital device according to claim 11, comprising means for generating electrical power.

14. The digital device according to claim 11, comprising fastening means intended to interact with a holder, the fastening means being configured so that manipulation of the fastening means with a view to detaching the digital device from the holder results in a disconnection of the power storage means.

15. A system for providing proofs of presence, comprising a server, and a digital device provided with a screen able to display a dynamic matrix barcode, the digital device and the server comprising hardware and software configured to implement the method for providing proof of presence according to claim 1.

16. A non-transitory computer-readable data storage medium on which is stored a computer program comprising program-code instructions for implementing the method for providing proof of presence according to claim 1 when said program is run on a computer.

17. A computer program product comprising the non-transitory computer-readable data storage medium according to claim 16.

18. The method for providing proof of presence according to claim 1, wherein the communication terminal is a smartphone.

19. The method for providing proof of presence according to claim 5, wherein the displaying has a duration comprised in a range of from ten seconds to ten minutes.

20. The method for providing proof of presence according to claim 7, wherein the method uses XOR or AES encryption.

21. The digital device according to claim 11, wherein the digital device comprises a display device configured to display initialization data comprising:
a start index,
the at least one computational parameter,
a datum on refresh frequency.

22. The digital device according to claim 21, wherein the display device comprises a screen configured to display an initialization matrix barcode comprising the initialization data and a computer address of a server to which the initialization data obtained from scanning the initialization matrix barcode is to be transmitted.

\* \* \* \* \*